(12) United States Patent
Takizawa

(10) Patent No.: US 9,042,547 B2
(45) Date of Patent: May 26, 2015

(54) IMAGE FORMING APPARATUS

(71) Applicant: Oki Data Corporation, Tokyo (JP)

(72) Inventor: Kazuhiko Takizawa, Tokyo (JP)

(73) Assignee: Oki Data Corporation, Tokyo (JP)

(*) Notice: Subject to any disclaimer, the term of this patent is extended or adjusted under 35 U.S.C. 154(b) by 0 days.

(21) Appl. No.: 14/033,645

(22) Filed: Sep. 23, 2013

(65) Prior Publication Data

US 2014/0086410 A1 Mar. 27, 2014

(30) Foreign Application Priority Data

Sep. 24, 2012 (JP) ................................. 2012-209745

(51) Int. Cl.
*H04N 7/167* (2011.01)
*H04L 9/28* (2006.01)
*G06F 21/60* (2013.01)
*G06F 21/84* (2013.01)

(52) U.S. Cl.
CPC ................ *H04L 9/28* (2013.01); *G06F 21/608* (2013.01); *G06F 21/84* (2013.01)

(58) Field of Classification Search
CPC ....... G06F 21/608; G06F 21/00; G06F 21/84; G06F 2211/008; H04L 9/28
USPC .......................................................... 380/243
See application file for complete search history.

(56) References Cited

U.S. PATENT DOCUMENTS

| 4,605,820 A * | 8/1986 | Campbell, Jr. .................. 705/71 |
| 2009/0292918 A1* | 11/2009 | Mori et al. ..................... 713/168 |
| 2010/0131753 A1* | 5/2010 | Ha ................................. 713/153 |

FOREIGN PATENT DOCUMENTS

| JP | 2001202167 A | 7/2001 |
| JP | 2004-361995 A | 12/2004 |
| JP | 2006-240007 A | 9/2006 |
| JP | 2007-060046 A | 3/2007 |
| JP | 2007-259300 A | 10/2007 |
| JP | 2008-262550 A | 10/2008 |
| JP | 2009251847 A | 10/2009 |

* cited by examiner

*Primary Examiner* — Dant Shaifer Harriman
*Assistant Examiner* — Abiy Getachew
(74) *Attorney, Agent, or Firm* — Muncy, Geissler, Olds & Lowe, P.C.

(57) ABSTRACT

An image forming apparatus includes a memory unit configured to store image data, a mode detecting unit configured to detect a transition from a first operating mode to a second operating mode, and an encryption unit configured to encrypt the image data in the memory unit based on the transition.

13 Claims, 18 Drawing Sheets

| PRINT JOB ID | USER ID | PRINT JOB NAME | USER SIDE ENCRYPTION | PRINTER SIDE ENCRYPTION |
|---|---|---|---|---|
| 20120530001 | user01 | secretMTG.doc | ✕ | ○ |
| 20120531002 | user01 | secretMTG2.doc | ✕ | ○ |
| 20120531003 | user01 | secretMTG3.doc | ✕ | ○ |
| 20120531004 | user02 | secretMTG4.doc | ○ | ✕ |
| 20120601005 | user01 | secretMTG5.doc | ✕ | ○ |
| 20120602006 | user01 | secretMTG6.doc | ✕ | ✕ |

FIG. 7

| HEADER PORTION | USER ID<br>PRINT JOB NAME<br>PRINT MODE<br>⋮ |
|---|---|
| DATA PORTION | IMAGE DATA (DOCUMENT DATA)<br>⋮ |

FIG. 15

| PRINT JOB ID | ON / OFF COUNT | USER ID | PRINT JOB NAME | USER SIDE ENCRYPTION | PRINTER SIDE ENCRYPTION | SUBMITTED DATE AND TIME | DELETED DATE AND TIME |
|---|---|---|---|---|---|---|---|
| 20120530001 | 3 | user01 | AlreadyDeleted.doc | × | ○ | 2012/05/30 08:40 | 2012/06/03 08:30 |
| 20120531002 | 3 | user01 | secretMTG.doc | × | ○ | 2012/05/31 08:50 | 2012/06/04 08:30 |
| 20120531003 | 3 | user01 | secretMTG2.doc | × | ○ | 2012/05/31 09:30 | 2012/06/04 08:30 |
| 20120531004 | 0 | user02 | secretMTG3.doc | ○ | × | 2012/05/31 09:40 | - |
| 20120601005 | 2 | user01 | secretMTG4.doc | × | ○ | 2012/06/01 10:30 | - |
| 20120602006 | 1 | user01 | secretMTG5.doc | × | ○ | 2012/06/02 09:30 | - |
| 20120604007 | 0 | user01 | secretMTG6.doc | × | × | 2012/06/04 10:30 | - |

FIG. 19

| PRINT JOB NAME | SUBMITTED DATE AND TIME | DELETED DATE AND TIME |
|---|---|---|
| secretMTG.doc | 2012/05/31 08:50 | 2012/06/04 08:30 |
| secretMTG2.ppt | 2012/05/31 09:30 | 2012/06/04 08:30 |

USER ID  User 01

PRINT JOB(S) ARE DELETED IN DESCRIBED BELOW
THE REASON : NO ORDER FOR ENCRYPTED PRINT
MODE, AND LET THE PRINT DATA
STORED FOR A LONG TIME

OK

IMAGE FORMING APPARATUS

CROSS-REFERENCE TO RELATED APPLICATION

This application claims priority under 35 U.S.C. §119 from Japanese Patent Application No. P 2012-209745, filed on Sep. 24, 2012, the disclosure of which is incorporated herein by reference.

BACKGROUND

1. Technical Field

This application relates to an image forming apparatus that enables to receive image forming data externally.

2. Description of Related Art

A conventional image forming system enables a print job to be provided from, for example, a personal computer to a printer, and the printer to print based on the print job. Some of the image forming system enables the printer to request an authentication for the printing, because someone might look at or take away recording media that is printed before a user that requested the printing comes to the printer.

Japanese patent publication 2008-262550 describes a printer authenticates using a card with authentication that has the IC (Integrated Circuit) tag, and the printer encrypts and records print data on data storage devices before printing.

However, the encrypted print data must be decrypted even though the printer might improve security level. Thus, the printer needs more time by decrypting print data when the printer prints.

SUMMARY

In view of the above, an image forming apparatus is disclosed that is capable of efficient document editing and of improving user convenience.

In particular, an image forming apparatus includes a memory unit configured to store image data, a mode detecting unit configured to detect a transition from a first operating mode to a second operating mode, and an encryption unit configured to encrypt the image data in the memory unit based on the transition.

BRIEF DESCRIPTION OF THE DRAWINGS

FIG. 7 is a schematic block diagram showing a print data;

FIG. 15 illustrates a print job control table that is managed by the printer in FIG. 14;

FIG. 19 illustrates a delete screen for deleting a print job that is displayed by the information processing device in FIG. 14;

DETAILED DESCRIPTION

Figure 1:
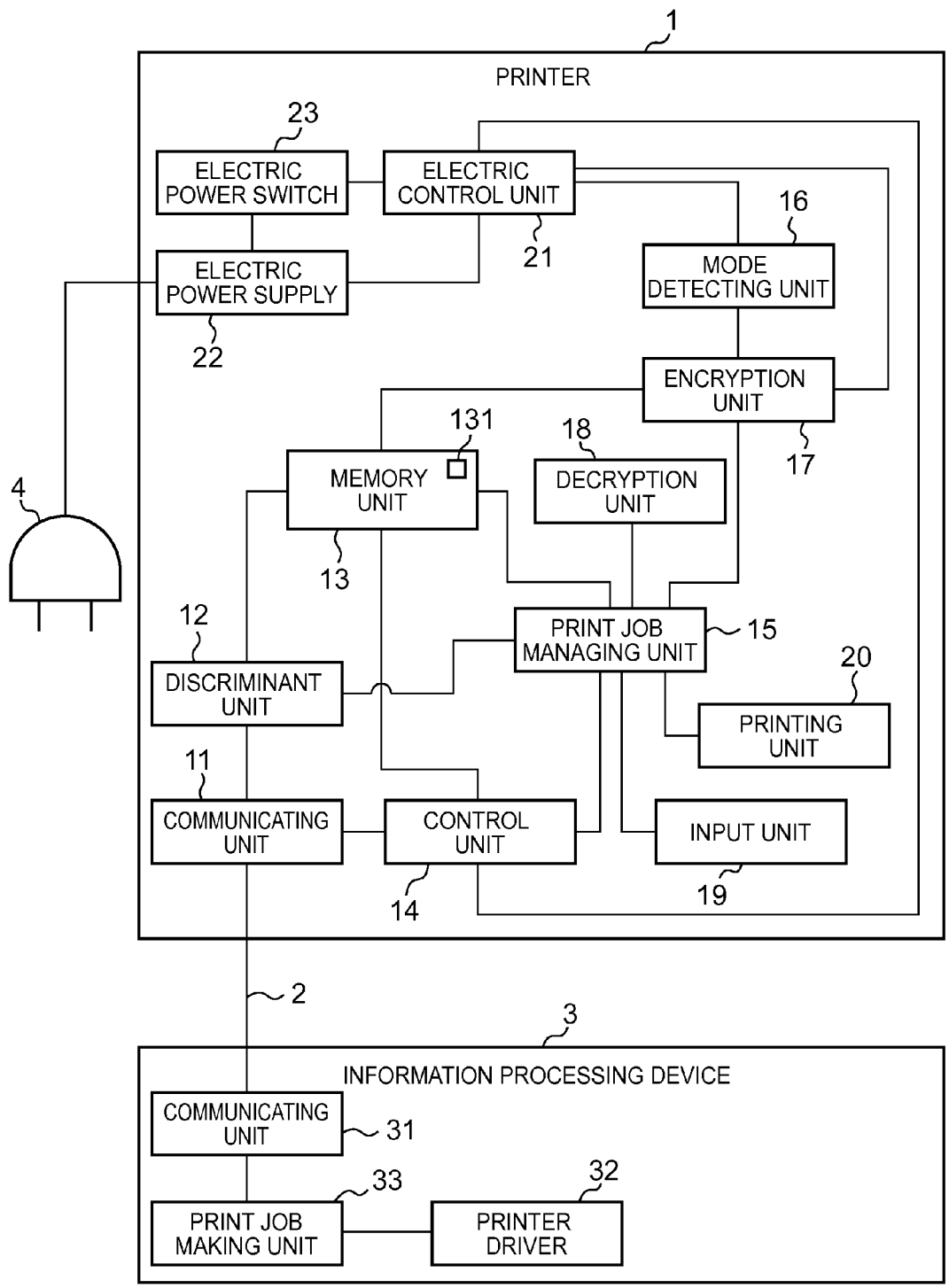
FIG. 1 is a schematic block diagram showing the composition of an image forming system according to a first illustrative embodiment.

Embodiments of the image forming system will be described with reference to FIGS. 1 to 20B of the drawings, in which like elements are indicated by like reference characters. In the drawings, configurations, positional relations, dimensions, and alignments of elements of the device are illustrated generally for understanding the embodiments and are only intended to facilitate understanding. Described materials and numerical values are merely exemplary. In the drawings, common elements of structures may be designated by the same reference characters, and an explanation thereof is occasionally omitted. Accordingly, embodiments are in no way limited to those illustrated.

Configuration of the Image Forming System in the First Embodiment

The configuration of a first embodiment of the image forming system is shown FIG. 1. The image forming system in FIG. 1 may include a printer 1 and one or more information processing device(s) 3 such as, for example, a PC (Personal Computer), as an external device. The printer 1 and the information processing device(s) 3 are connected via a network 2. An AC (Alternating-Current) power supply 4 may supply AC power to the printer 1.

The printer 1 may form and output an image by, for example, printing the image on a sheet such as a paper or a film after forming the image based on print data, for example, image data that is provided by the information processing device(s) 3.

Referring to FIG. 1, the printer 1 may include a communicating unit 11, a discriminant unit 12, a memory unit 13, a control unit 14, a print job managing unit 15, a mode detecting unit 16, an encryption unit 17, a decryption unit 18, an input unit 19, a printing unit 20, an electric control unit 21, an electric power supply 22, and an electric power switch 23.

Other implementations are possible in the printer 1, such as pure hardware implementations (e.g., specialized or application specific integrated circuits configured with logic to perform particular operations), or combinations of hardware and software and/or firmware.

On the other hand, in embodiments where one or more of the units 12-21, or parts thereof, is/are or include(s) a separate hardware device(s) such as an integrated circuit(s) configured with logic to perform operations of corresponding units 12-21.

The communicating unit 11 may receive print data (print job(s)) and some kinds of commands via the network 2. The commands may be orders for setting information or for controlling. And, the communicating unit 11 may send event information of the printer 1 to the information processing device(s) 3 via the network 2. The event information may be a notice of out of toner or of a failure in printing. The communicating unit 11 may change destinations between the discriminant unit 12 and the control unit 14 depending on received data. As a result of analyzing the received data, for example, the communicating unit 11 may send the print data to the discriminant unit 12, and send the other data to the control unit 14. The print data may be made based on PDL (Page Description Language).

The discriminant unit 12 may verify a print mode that is set in the print data, and the discriminant unit 12 may change ways to deal with the print data depending on the print mode.

In printing processes by the printer 1, there may be three print modes that depend on security level, for example, a normal print mode, authenticated print mode, and encrypted print mode. The numbers of the print mode are not limited to the three. If the print data is the normal print mode, the print data may be executed printing quickly or added to printing queues. If the print data is the authenticated print mode or the encrypted print mode, the print data may be executed recording the print data on the memory unit 13 once, and then the print data is executed printing or added to printing queues after authenticating for a user.

Referring to FIG. 7, a format of the print data is described. The print data may include a header portion and a data portion. The data portion may include data that needs to be encrypted, and the header portion may include the other data that needs not to be encrypted. In other words, the data portion may include graphic data and/or document data that should be printed, and the header portion may include a user ID (Identification), a name of the print job, and a print mode.

The memory unit 13 may store the print data, parameters (setting data), working data, and control programs. The memory unit 13 may be configured using a hard disk (HDD), a Read Only Memory (ROM), a Random Access Memory (RAM) or an Erasable Programmable Read Only Memory (EEPROM). In other words, any of the operations or functions discussed herein may be implemented on Non-Transitory Computer-Readable Media.

The control unit 14 may control each of elements included in printer 1, may execute control programs that are stored in the memory unit 13, and may oversee functions of the printer 1. For example, the control unit 14 may verify a command from the communicating unit 11, and the control unit 14 may operate in a manner that depends on the result of the verifying. The command may be a command to get status of supplies, to set status of supplies, or to access web page. And, the control unit 14 may send information relevant to the printer 1 to the information processing device(s) 3, and the control unit 14 may delete improper data when the control unit 14 receives the improper data.

The print job managing unit 15 may manage the print job(s). For example, the print job managing unit 15 may provide print data that is not encrypted to the printing unit 20, and the print job managing unit 15 may respond to the input unit 19 after the print job managing unit 15 obtains print data corresponding to a user ID that is set by the input unit 19. And, the print job managing unit 15 may provide both the encrypted print data and a password to the decryption unit 18, and then the print job managing unit 15 may send decrypted print data to the printing unit 20 after the decryption for the encrypted print data.

The printing unit 20 may execute printing on recording media based on the print data that is provided by the print job managing unit 15. The print data that is provided by the print job managing unit 15 may not be encrypted. A printing method may be the electrographic system.

The input unit 19 may be user interface. The user interface may be, for example, a touch screen that takes instruction(s) on the manipulation of the printer 1 from user or displays information for user. The input unit 19 may display supplies status, operating status, and button(s) to take instruction(s) from user. The supplies status may indicate a remaining amount of toner and sheets, and the operating status may indicate a sleeping (saving power) or an executing printing. The input unit 19 is not limited to the touch screen, for example the input unit 19 may be a pair of buttons as hardware and a display.

The electric power supply 22 receives electric power from the AC electric power supply 4.

The electric power switch 23 may switch to supply electric power to electric power supply 22. The electric power switch 23 may switch depending on an operation by user. The electric power switch 23 may send a notice of a turn-off to the electric control unit 21, when the electric power switch 23 turns off. And, the electric control unit 21 sends the notice of the turn-off to the mode detecting unit 16, and the electric control unit 21 executes the transition to the turn-off mode after permitting by the mode detecting unit 16. The user may turn on the electric power switch 23 after the turn-off.

The electric control unit 21 may manage the operating status. In particular, the electric control unit 21 may decide a mode of power consumption, and control the electric power for each units in the printer 1 depending on the mode of power consumption. There may be three operating modes of the power consumption, for example, a normal operating mode, a sleep operating mode that is less power consumption than the normal operating mode, and the turn-off mode. The sleep operating mode may have more modes depending on a degree of reducing power consumption.

When the printer 1 works in the sleep operating mode, the printer 1 may receive notices of return by external device(s) and data. When the printer 1 works in the turn-off mode, the printer 1 may not work except for taking instruction of the turn-on. The transition from the normal operating mode to the sleep operating mode or the turn-off mode may execute under a predetermined condition, for example, the electric power switch is turned off, and the print data is not provided from the information processing device 3 during a predetermined time.

The electric control unit 21 may execute the transition according to order(s) from the mode detecting unit 16.

The mode detecting unit 16 may make each units in the printer 1 execute preliminary process for the transition when the electric control unit 21 executes the transition to another operating mode. And, the mode detecting unit 16 may allow the electric control unit 21 to execute the transition after the preliminary process.

In the preliminary process, the mode detecting unit 16 may encrypt print data in the memory unit 13. The print data that the mode detecting unit 16 encrypts may be in the authenticated print mode. The encryption by the mode detecting unit 16 may be executed when the electric control unit 21 executes a transition from the first mode to the second mode that is less power consumption than the first mode. The first mode may be the normal operating mode, and the second mode may be the sleep operating mode or the turn-off mode. For example, the encryption by the mode detecting unit 16 may be executed when the electric control unit 21 executes the transition from the normal operating mode to the sleep operating mode. However, as described in the above example, the first mode and the second mode is not limited, for example, the first mode may be the normal operating mode or the sleep operating mode, and the second mode may be the turn-off mode.

The mode detecting unit 16 may hold the execution for the transition by the electric control unit 21 till the printing process is finished.

The encryption unit 17 may encrypt the print data in the memory unit 13. The header (FIG. 7) may include a password for the encryption. The encryption unit 17 may encrypt with the password directly, encrypt with a cryptography key that is converted the password to the cryptography key, or encrypt with a public key or a private key that is managed by an authentication server (not shown). And, the password included in the header may be deleted after the encryption if the encryption unit 17 encrypts with the password directly.

The decryption unit 18 may decrypt the encrypted print data in the memory unit 13. The print job managing unit 15 may specify the encrypted print data what the decryption unit 18 decrypts. And, the decryption unit 18 may decrypt the encrypted print data with a decryption key that is provided by the print job managing unit 15.

Configuration of the Information Processing Device

Referring to FIG. 1, the information processing device 3 may have functions of a communicating unit 31, a printer driver 32, a print job making unit 33, and an application 34. If software may be installed to a PC (Personal Computer), the PC may have functions as the information processing device 3.

The communicating unit 31 has functional sending the print data, and sending setting information about the printer 1.

The application 34 may ask the printer 1 to execute printing process. The application 34 may be, for example, software for word processing, spreadsheet software, or software for image editor.

The printer driver 32 may display an operation screen for setting information about printing process, and the printer driver 32 may extract parameters from the setting information.

Figure 2:
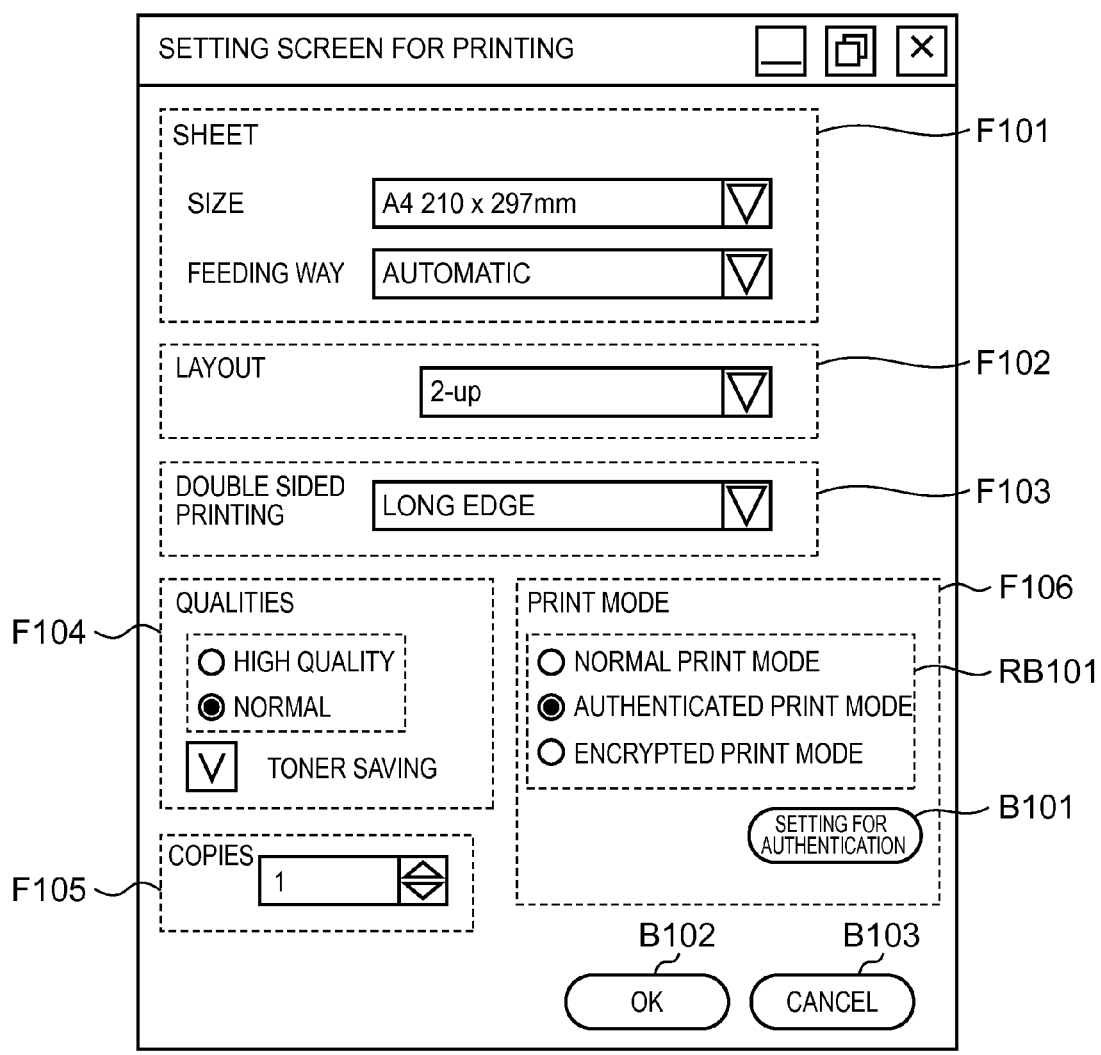
FIG. 2 illustrates a setting screen for a printing.

FIG. 2 is an operation screen for setting information about a printing process (setting screen for a printing). The setting screen for a printing may be displayed by not only the application 34 but also the set printer properties in the Microsoft Windows®OS (Operating System). The setting screen for a printing may include an ok button B102 and a cancel button B103.

The setting screen for a printing may include a setting sheet field F101 (FIG. 2). The setting sheet field F101 may support user to select a size and a feeding way of a printing with the list box. As shown in FIG. 2, the size is selected the "A4 210*297 mm", and the feeding way is "automatic select".

The setting screen for printing may include a setting layout field F102. The setting layout field F102 may support user to select a layout for the printing with the list box. As shown in FIG. 2, the layout is selected the "2-up". The 2-up indicates a layout to print two pages per sheet.

The setting screen for the printing may include a setting double sided printing field F103. The setting double sided printing field F103 may support user to select a double sided printing with the list box. The double sided printing is selected the "long edge" (FIG. 2, F103).

The setting screen for the printing may include a setting qualities field F104. The setting quality field F104 may support user to select qualities for the printing with the radio button and the check box. The qualities are selected the "normal" and the "toner saving" (FIG. 2, F104). The "toner saving" indicates that the printing is executed under the saving of toner.

The setting screen for the printing may include a setting copies field F105. The setting copies field F105 may support user to select copies for printing with the spin button. The copies are selected the "1" (FIG. 2, F105).

The setting screen for the printing may include a setting print mode field F106. The setting print mode field F106 may support user to select the print mode with the radio button RB101. And, setting print mode field F106 may include a setting for authentication button B101 to display a setting screen for authentication. The setting screen for authentication may be set a user ID and a password by a user. The print mode is selected the "authenticated print mode" (FIG. 2, F106).

Figure 3:
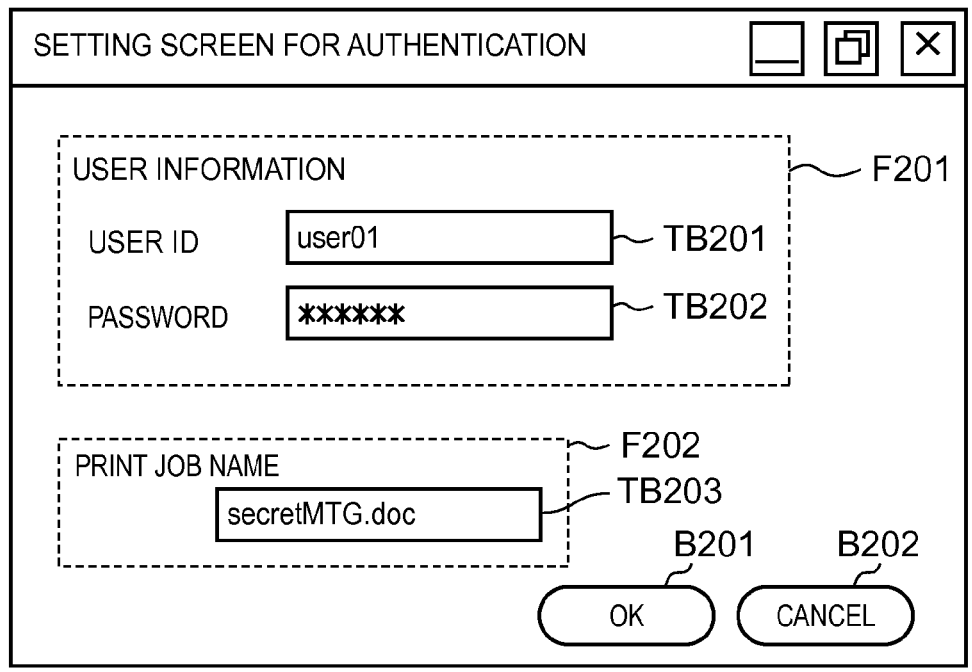
FIG. 3 illustrates a setting screen for an authentication.

If the setting for authentication button B101 may be clicked, the printer driver 32 pops up the setting screen for authentication on the screen (FIG. 3).

The setting screen for authentication may include a user information field F201, a print job name field F202, an ok button B201, and a cancel button B202. The user information field F201 may support user to enter the user ID and password, and the print job name field F202 may support user to enter the print job name. The ok button B201 may make a decision to set the incoming information that user enters in field F201 and F202. And, the cancel button B202 may make a decision not to set the incoming information that user enters in field F201 and F202. The user information field F201 may include a user ID text box TB201 that is input the user ID and a password text box TB202 that is input the password. The print job name field F202 may include a print job name text box TB203 that is input the print job name.

As shown in FIG. 3, the user ID text box TB201 is set the "user01" as a user ID. The print job name may be used to identify in the print jobs.

If the ok button B102 is clicked, the printer driver 32 may ask the print job making unit 33 to make a print job based on both data that is created by the application 34 and the each setting information (FIG. 2, FIG. 3). The data may be, for example, an image data, a document data, and both of the image data and the document data. The print job may be nearly equal to the print data.

If the normal print mode is selected, the print job making unit 33 may make the print job without using the user ID, the password, and the print job name. If the authenticated print mode is selected, the print job making unit 33 may make the print job adding the user ID, the password, and the print job name. Specifically, the print job making unit 33 may set both the user ID and the print job name to the header portion (FIG. 7). If the encrypted print mode is selected, the print job making unit 33 may make the print job adding the user ID, the password, and the print job name, and the print job making unit 33 may encrypt the data in the data portion (FIG. 7) with the password. The way of encryption by the print job making unit 33 may be same as the way of encryption by the encryption unit 17. After making the print job (print data), the print job making unit 33 may provide the print data to the communicating unit 31, and the communicating unit 31 may send the print data to the printer 1.

Constitution of Management for the Print Job

Figures 5, 6:
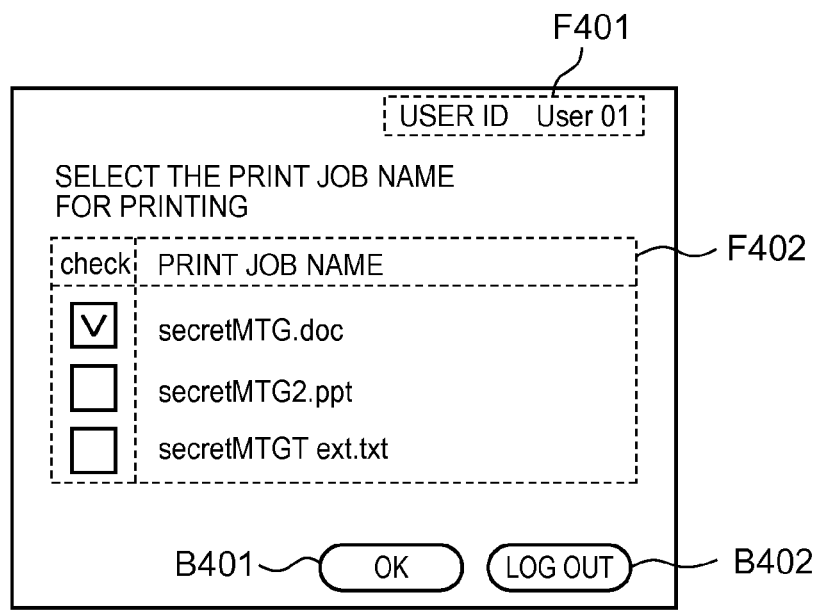
FIG. 5 illustrates a selection screen of print jobs.
FIG. 6 is a schematic block diagram showing a print job control table.

The print job managing unit 15 may manage the print job(s) with the print job management table 131 (FIG. 6). If the print job(s) select the authenticated print mode or the encrypted print mode, the print job(s) may be listed up to the print job management table 131. The print job management table 131 may be stored in the memory unit 13.

As shown in FIG. 6, the print job management table 131 may include print job management information 132-1 to 132-6. The print job management information 132 may include print job ID(s), user ID(s), print job name(s), user side encryption(s), and printer side encryption(s).

The print job ID(s) that may be set by the print job managing unit 15 identify the print job. The print job ID(s) may be serial numbers (FIG. 6). The user ID(s) and print job name(s) may be set based on the header portion (FIG. 7).

The user side encryption(s) indicates that whether the print data is encrypted by the information processing device 3. As shown in FIG. 6, if the user side encryption(s) are "O", the user side encryption(s) indicates that the print data is encrypted by the information processing device 3 (FIG. 6, 132-3), and the print mode of the print data indicates the encrypted print mode. If the user side encryption(s) are "X", the user side encryption(s) may indicate that the print data is not encrypted by the information processing device 3 (FIGS. 6, 132-1 to 132-3, 132-5).

The printer side encryption(s) indicates that whether the print data is encrypted by the encryption unit 17 in the printer 1. If the printer side encryption(s) are "O", the printer side encryption(s) indicates that the print data is encrypted by the encryption unit 17 (FIGS. 6, 132-1 to 132-3, 132-5), and the print mode of the print data is the authenticated print mode. If the printer side encryption(s) are "X", the printer side encryption(s) indicates that the print mode of the print data is the encrypted print mode (FIG. 6, 132-4) or the print mode of the print data is the authenticated print mode (FIG. 6, 132-6). The print job managing unit 15 updates the printer side encryption(s) from "X" to "O" if the print job managing unit 15 encrypts the print data.

The print data is enabled to access based on the print job management table 131. The print job management information 132 may be deleted when the print data is executed printing process.

Request the Printing Process

Figure 4:
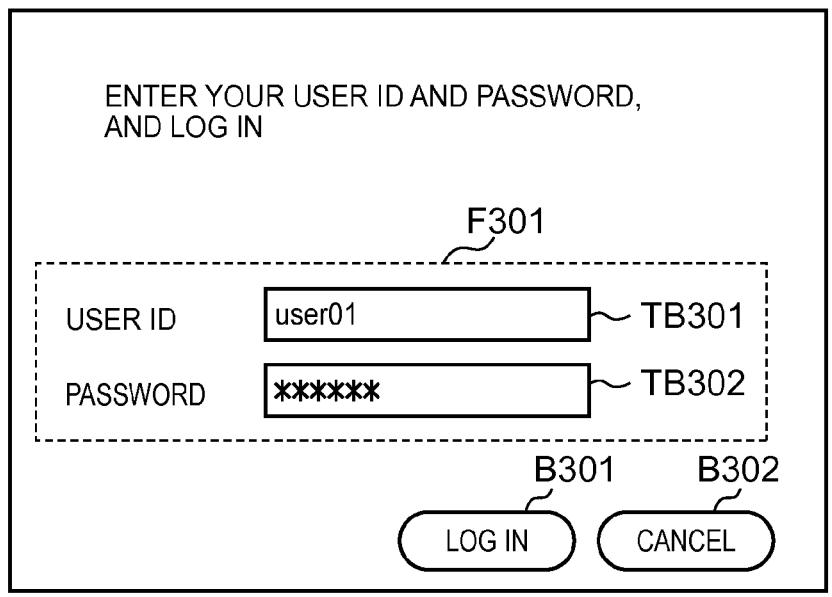
FIG. 4 illustrates a login screen.

If the printer 1 requests printing process in the authenticated print mode or the encrypted print mode, the user ID and password may be needed to authenticate on the login screen (FIG. 4). The login screen may be a default screen or the login screen may be displayed depend on an operation by user.

The login screen may include an authentication entry field, a login button B301, and a cancel button B202. The authentication entry field F301 may support user to enter the user ID and password. The login button B301 may login with the incoming information that user enters in field F301. And, the cancel button B302 may make a decision not to log in. The authentication entry field F301 may include a user ID text box TB301 that is set the user ID and a password text box TB302 that is set the password.

When the user ID and password is set and the login button B301 may be clicked, the print job managing unit 15 obtains the user ID and password, and the print job managing unit 15 may authenticate based on the user ID and password.

However, the way and constitution of the authentication by the print job managing unit 15 is not limited to the description above. For example, the print job managing unit 15 may authenticate with a database that stores pairs of user ID(s) and password(s) in memory unit 13, and the print job managing unit 15 may ask authentication server (not shown) to authenticate.

As a result of the authentication, if the login is successful, the print job managing unit 15 may obtain all the print job management information in accordance with the logged in user ID from the print job management table 131, and then the print job managing unit 15 may make the input unit 19 display a print job selection screen (FIG. 5), based on the print job management information 132 that is obtained.

As shown in FIG. 5, the print job selection screen may include a display field F401, a display field F402, an ok button B401, and a logout button B402. The display field F401 may display a logged in user ID, and the display field F402 may display all the print job management information in accordance with the logged in user ID, and the display field F402 may support user to select the print job(s) in the print job selection screen. The ok button B401 may make a decision to execute the printing process of selected the print job(s). And, the logout button B402 may make a decision to log out.

The display field F401 displays "user01" (FIG. 5), so a logged in user ID may indicate that the logged in user has the "user01" as user ID.

The display field F402 may include a list for the print jobs) in accordant with a logged in user (FIG. 5, user01), and check box(es). If the check box(es) are selected, the print jobs) correspondent with the selected check box(es) may be set for executing the printing process. And, if the ok button B401 is clicked, the control unit 14 may control the execution of the printing process for the selected print job(s).

Processing of the Image Forming System

Figure 8:
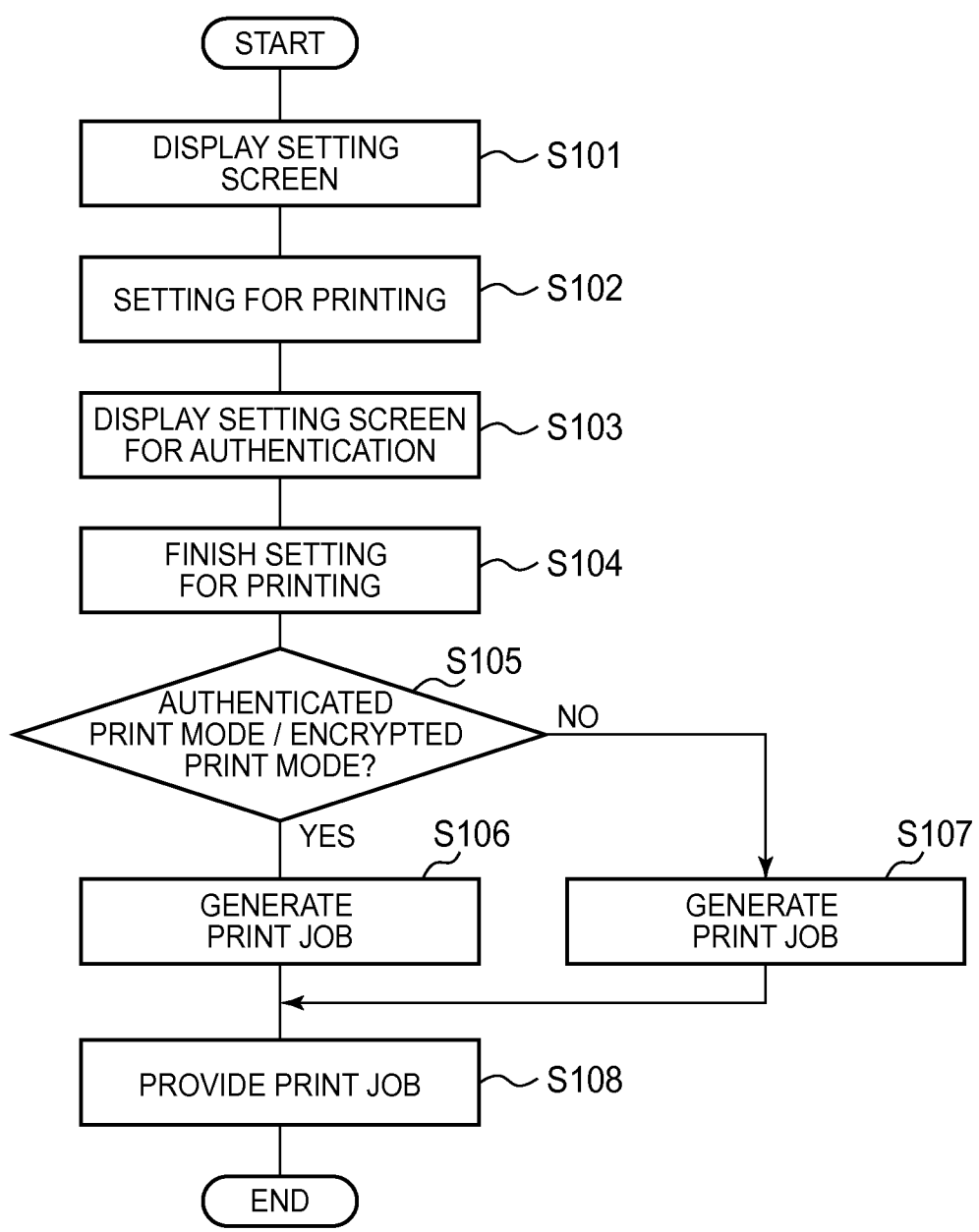
FIG. 8 is a flowchart showing information processing device operation when a process of requesting a print is executed.

Referring to FIG. 8, processing of the information processing device 3 is described below. At first, the executing printing process may be requested with using the application 34 by user, and the printer driver 32 may display the setting screen for a printing on the screen in information processing device 3 (S101).

And, at least the sheet and the layout for the printing process may be selected, and then the setting for authentication button B101 is clicked (S102).

Next, the printer driver 32 may make the input unit 19 display the setting screen for authentication (S103). The user ID may be, for example, "user01" in this processing.

If the user ID, the password, and the print job name are entered on the setting screen for authentication, and the ok button B201 is clicked, the setting screen for a printing may be displayed again. Next, when the ok button B102 is clicked on the setting screen for a printing, the print job (print data) is started generating by the print job making unit 33 (S104). The printer driver 32 may display setting information that was entered previously when the setting screen for a printing is displayed next time.

Next, the print job making unit 33 checks the print mode that is set on the setting screen for a printing (S105). If the print mode is the normal print mode, at S107 is proceeded. If the print mode is the authenticated print mode or the encrypted print mode, at 5106 is proceeded.

Next, if the print mode is the authenticated print mode, the print job making unit 33 generates the print job that is set the user ID and the print job name, and the print job making unit 33 sets the password to the header portion in the print data (S106). If the print mode is the encrypted print mode, the print job making unit 33 generates the print job that is set the user ID and the print job name, and the print job making unit 33 encrypts the data portion in the print data (S106).

If the print mode is the normal print mode, the print job making unit 33 generates the print job without using the authentication information on the setting screen for a printing (S107).

Next, the printer driver 32 provides the print job to the information processing device 3 via the communicating unit 31 (S108).

Processing of the Printer

Figure 9:
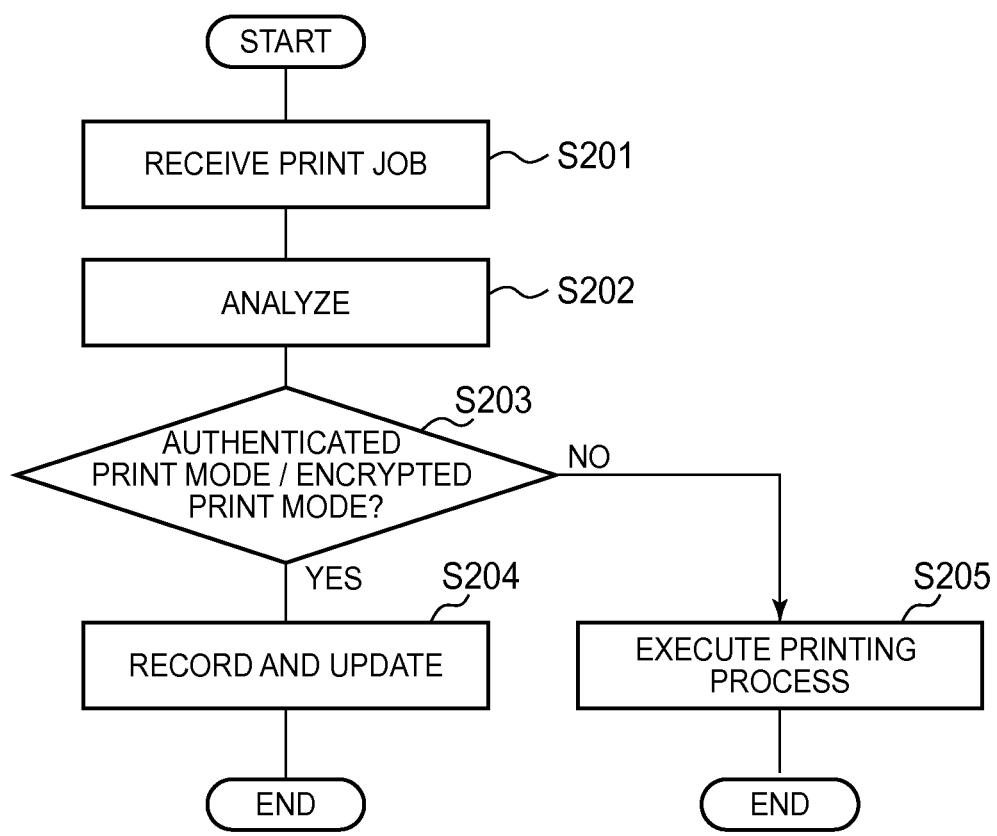
FIG. 9 is a flowchart showing printer operation when a process of receiving a print job is executed.

Referring with FIG. 9, a processing of the printer 1 that receives the print job from the information processing device 3 is described below.

At first, if the communicating unit 11 is provided the print job, the communicating unit 11 provides the print job to the discriminant unit 12 (S201).

Next, the discriminant unit 12 analyzes the print data provided by the communicating unit 11 (S202). In particular, the discriminant unit 12 analyzes the header portion about the print mode, the user ID, the print job name, and whether the data portion is encrypted.

Next, as a result of the analyzing, if the print job is decided to print as the normal print mode (S203), the discriminant unit 12 provides the print job (print data) to the printing unit 20 via the print job managing unit 15. And, the printing unit 20 executes the printing process after rasterizing the print job (S205).

Meanwhile, if the print job is decided to print as the authenticated print mode or the encrypted print mode (S203), the discriminant unit 12 creates a print job ID for the print job, and makes the print job store in the memory unit 13. And, the print job managing unit 15 may update the print job management table 131 by adding the print job management information 132 (S204). If the print mode is the authenticated print mode, the print job managing unit 15 sets "X" to both the user side encryption and the printer side encryption. If the print mode of print job is the encrypted print mode, the print job managing unit 15 sets "O" to the user side encryption and sets "X" to the printer side encryption.

Processing of the Printer

Referring with FIGS. 10 to 12, a processing of the transition from the normal operating mode to the sleep mode or the turn-off mode in the printer 1 is described below.

Figure 10:
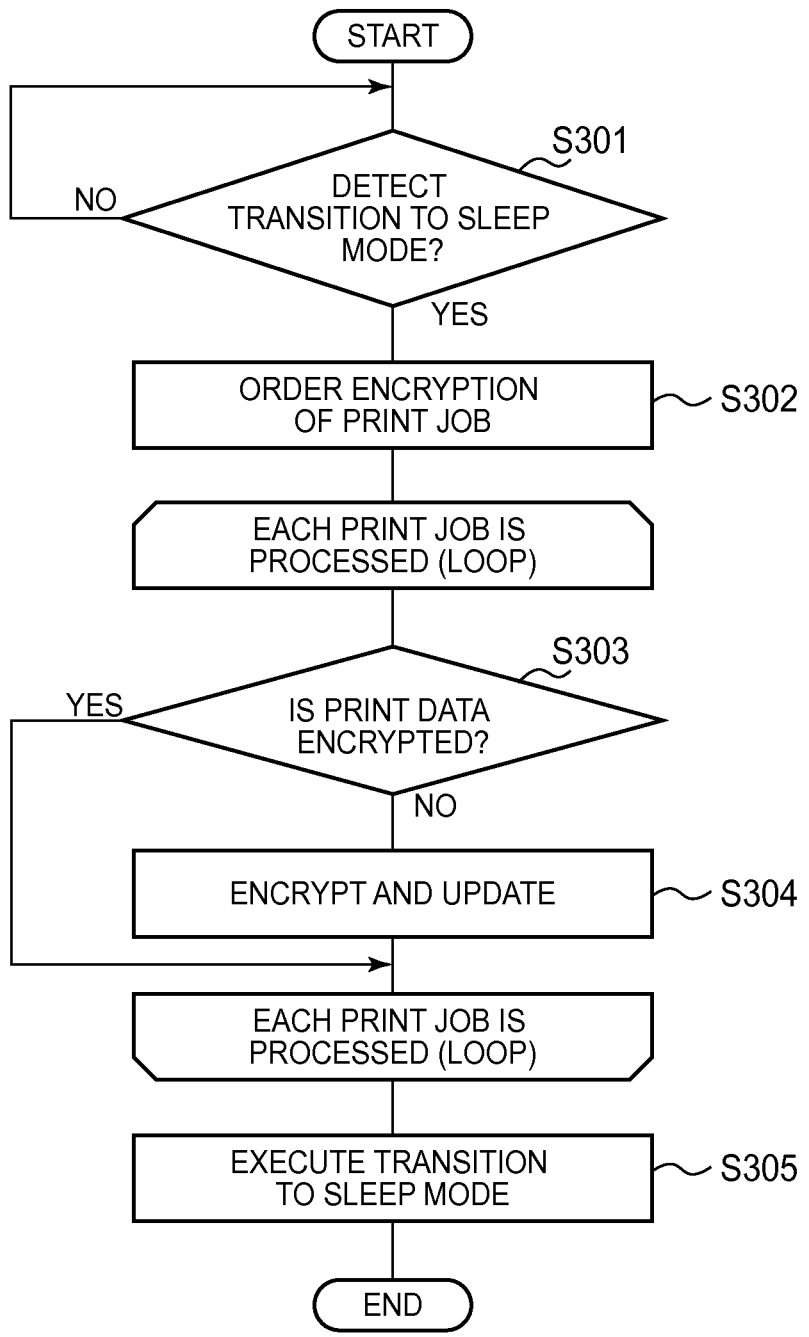
FIG. 10 is a flowchart showing printer operation when a process of making a transition to a sleep mode is executed.

As shown in FIG. 10, the mode detecting unit 16 monitors the electric control unit 21 (S301). If, as a result of the monitoring, the mode detecting unit 16 detects a transition from the normal operating mode to the sleep mode, the mode detecting unit 16 may provide the order for the encryption of all the print data to the encryption unit 17, and the mode detecting unit 16 makes the encryption unit 17 encrypt all of the print job(s) in the memory unit 13 (S302).

The encryption unit 17 may refer to the print job management table 131, and execute a process repeatedly at S303 and S304 for all the print job(s).

The encryption unit 17 may refer to the print job management table 131, and select a print job from the print job management table 131, and check whether the print data of the selected print job is encrypted. In particular, the print job monitoring unit 24 may check whether the user side encryption or the printer side encryption is "O" (FIG. 6). Next, if the print data is not encrypted (S303), the encryption unit 17 may encrypt the print data, and update "X" of the printer side encryption to "O" (S304).

If the encryption unit 17 finishes executing the process at S303 and S304 for all the print job(s), the encryption unit 17 may inform the finish of the processes at S303 and S304 to the mode detecting unit 16. And, if the other elements are finished to prepare the transition, the mode detecting unit 16 may allow the electric control unit 21 to execute the transition to the sleep operating mode (S305).

Figure 11:
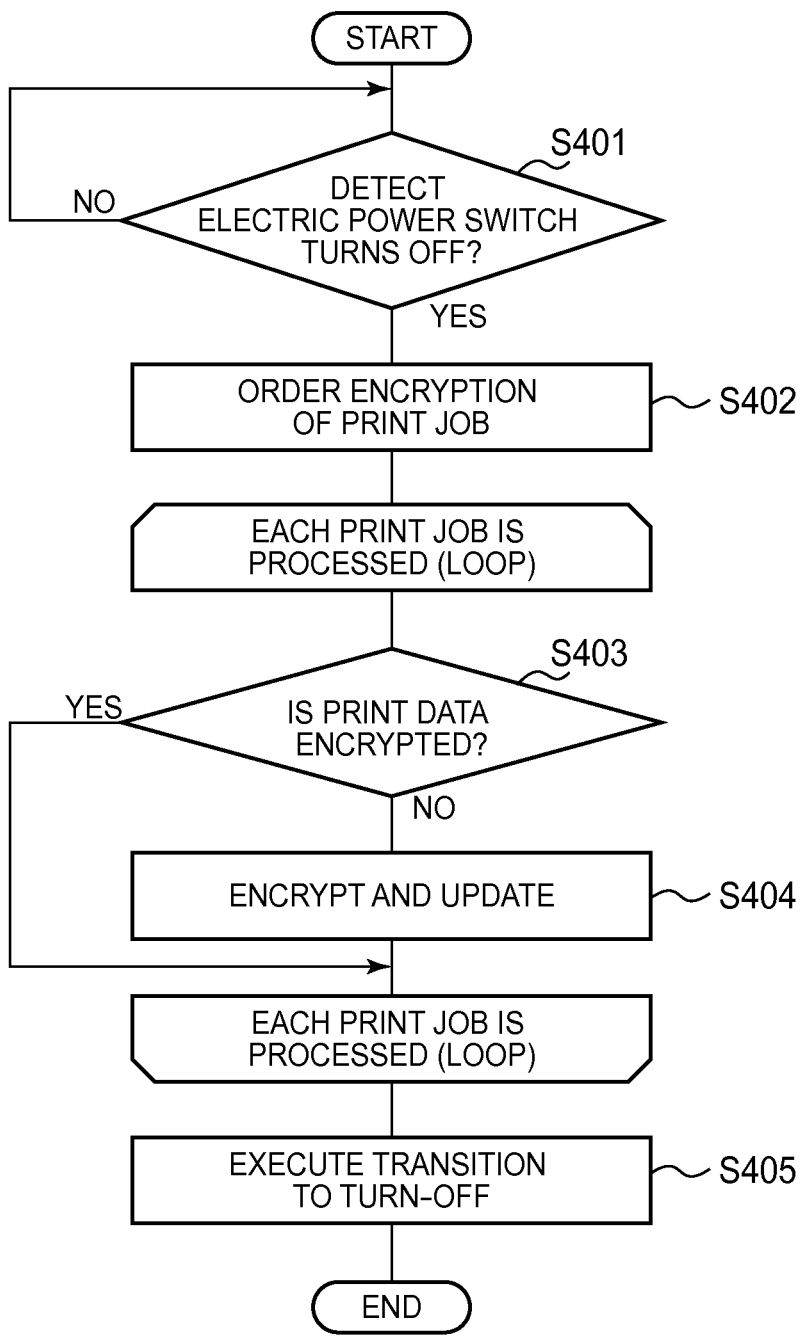
FIG. 11 is a flowchart showing printer operation when a process of detecting a turn off command is executed.

As shown in FIG. 11, the mode detecting unit 16 monitors the electric control unit 21 (S401), and the electric power switch 23 turns off when the printer 1 works with the normal operating mode. The process of transition to the turn-off mode is described below.

Next, after processes at S402 to S404 are executed, the mode detecting unit 16 may allow the electric control unit 21 to execute the transition to the turn-off mode. The processes at S402 to S404 may be same to the processes at S302 to S304.

And, the electric control unit 21 executes the transition to the turn-off mode for the printer 1 (S405).

Figure 12:
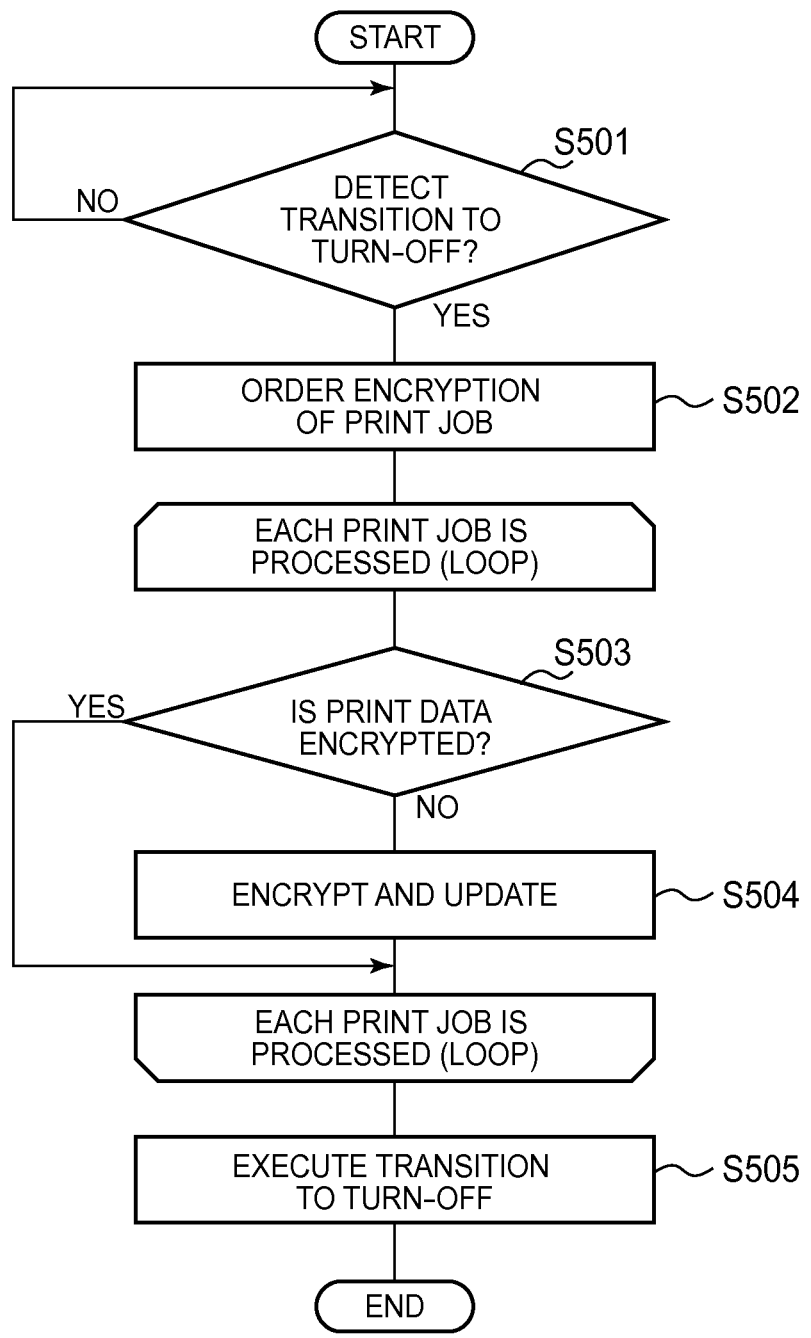
FIG. 12 is a flowchart showing printer operation when a process of making a transition to a turn off mode is executed.

Next, as shown in FIG. 12, the mode detecting unit 16 monitors the electric control unit 21 (S501), and the printer 1 works with the normal operating mode. The process of transition to the turn-off mode is executed because of non-use for a predetermined time with the printer 1.

After processes at S502 to S504 are executed, the mode detecting unit 16 may allow the electric control unit 21 to execute the transition to the turn-off mode. The processes at S502 to S504 may be same to the processes at S302 to S304. And, the electric control unit 21 executes the transition to the turn-off mode for the printer 1 (S505).

Printing Processing of the Printer

Figure 13:
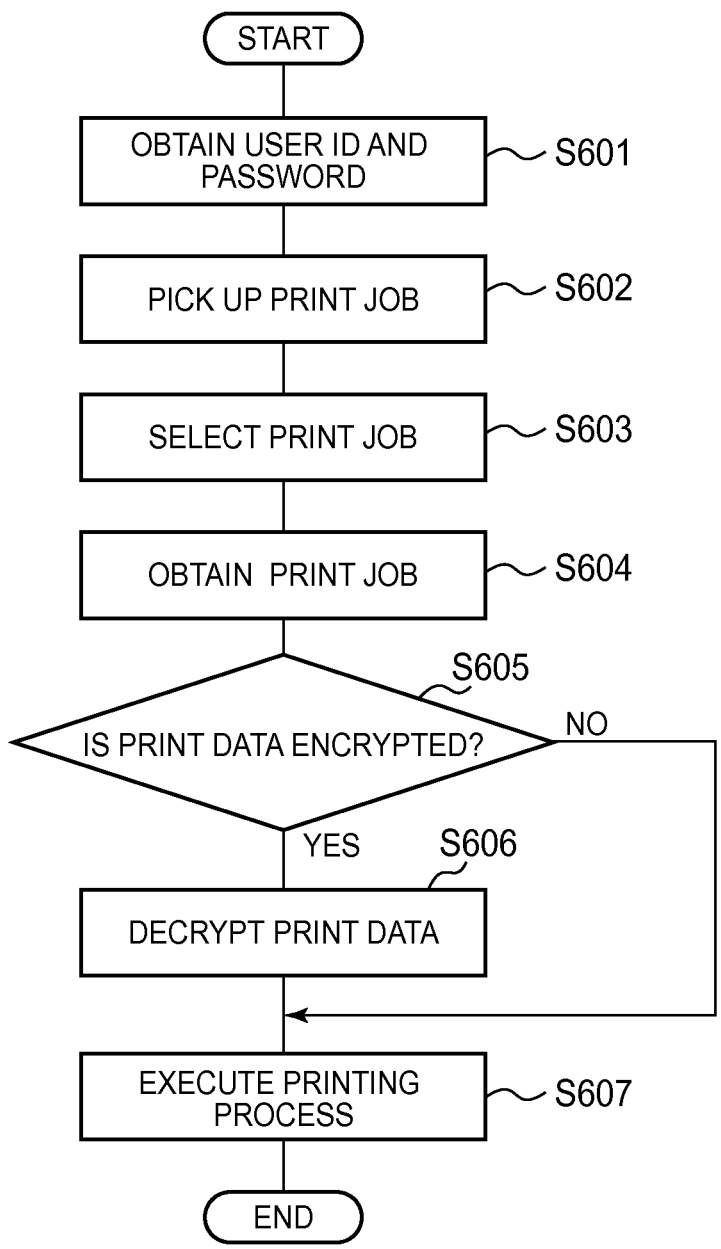
FIG. 13 is a flowchart showing printer operation when a process of printing with an authentication is executed.

Referring to FIG. 13, a printing processing with the authenticated print mode or the encrypted print mode is described below.

At first, the login screen is displayed on the input unit 19 by user (FIG. 4), and a user ID and a password are entered by user. Next, the print job managing unit 15 authenticates based upon the user ID and the password that are entered (S601).

Next, the print job managing unit 15 picks up the print job(s) corresponding to the user ID from the print job management table 131 (S602). The print job managing unit 15 makes the input unit 19 display a print job selection screen (FIG. 5), and receives a selection for execution of printing by a user (S603).

Next, the print job managing unit 15 obtains the print data that is selected by a user (S604).

The print job managing unit 15 checks whether the print data of the selected print job is encrypted. And, if the print data is encrypted, the decryption unit 18 decrypts the print data (S605, S606). The print job managing unit 15 passes the password that is entered by the user to the decryption unit 18 when the print job managing unit 15 orders the decryption unit 18 to decrypt.

Next, the print job managing unit 15 provides the print data to the printing unit 20, and the printing unit 20 rasterize and executes printing process for the print data (S607).

The print data is executed the process of encryption in the memory unit 13 even though the printer 1 works with the sleep operating mode or turn-off mode. Thus, the print data that is unencrypted is avoided storing in the memory unit 13 for long time, and the printer 1 may improve security. The printer 1 may the CPU (Central Processing Unit) that has function of processing information other than image, and the CPU is not same to the CPU that is installed the information processing device 3. This is because the CPU that is installed the information processing device 3 may be a CPU that tends to be low cost and low performance, and the time to decrypt by the printer 1 is longer than the time by a PC (Personal Computer). As a result of number of the decryption by the printer 1 is curtailed, the image forming system may improve usage.

The printer 1 has the authenticated print mode. The print data in authenticated print mode is not encrypted as long as the printer 1 works with normal operating mode, and the print data in authenticated print mode needs the authentication when the print data is executed the printing process. Thus, the security process (the encryption and decryption) may be reduced with retaining security.

Configuration of the Image Forming System in the Second Embodiment

Figure 14:
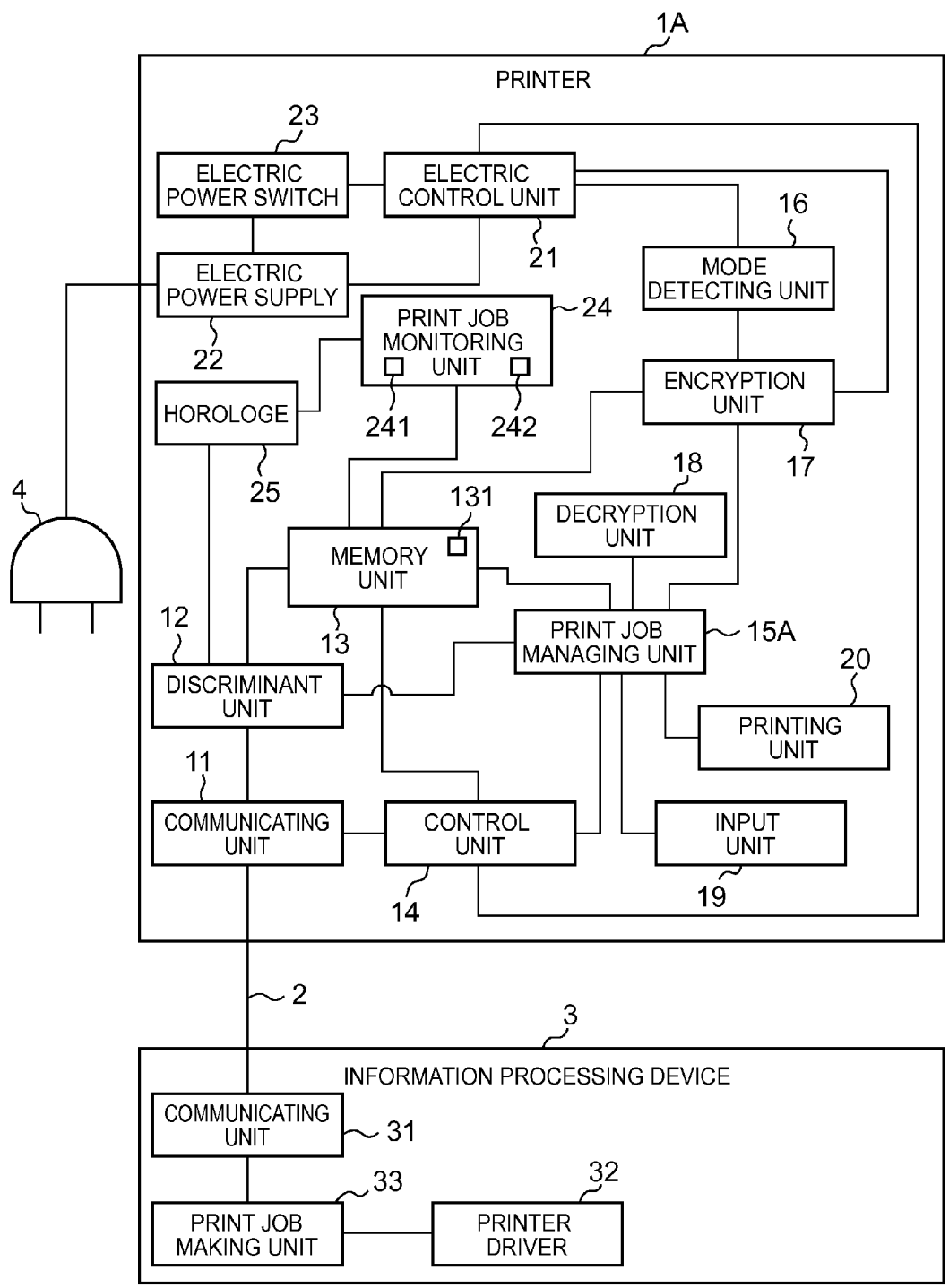
FIG. 14 is a schematic block diagram showing the composition of an image forming system according to a second illustrative embodiment.

As shown in FIG. 14, the printer 1A includes a print job monitoring unit 24 and a horologe 25 in addition to the configuration of the printer 1 in the first embodiment. And, the print job managing unit 15 and the print job management table 131 may be replaced by the print job managing unit 15A and the print job management table 131A.

And, compared with the first embodiment, the print data in the memory unit 13 may be deleted by the print job monitoring unit 24 if predetermined condition(s) meet.

As shown in FIG. 15, the print job management information 132A includes a submitted date and time, a deleted date and time, and an on/off count(s) in addition to the configuration of the print job management information 132 in the first embodiment.

The submitted date and time may indicate a date and time whose print data (print job(s)) is provided to the printer 1A by the information processing device(s).

The deleted date and time may indicate a date and time whose print data (print job(s)) is deleted in the memory unit 13.

The on/off count(s) may indicate a parameter that is managed by the print job monitoring unit 24. The parameter is count(s) that the printer 1A turns on from turning off. The print job monitoring unit 24 may delete the print data when the on/off count(s) is greater than a threshold value n. The threshold value n may be equal to 3.

The print job monitoring unit 24 may include a number of turning-on managing module 241 and a print job deleting module 242. The number of turning-on managing module 241 may have function of managing the each print job's number of the turning on in the printer 1A. The print job deleting module 242 may have function of deleting the print data when the on/off count(s) is greater than a threshold value n.

The horologe 25 measures current time, and may provide current time to the print job monitoring unit 24 in response to a request. The print job monitoring unit 24 may set the submitted date and time and deleted date and time based upon the current time.

Processing of the Printer

Referring with FIG. 8, a processing of the printer 1A that receives the print job from the information processing device(s) 3 is described below.

Compared with the first embodiment, a process at S106 in the second embodiment is set extra information, for example, the on/off count(s) and the submitted date and time, in the print job management information 132A. The print job managing unit 15A may set 0 to the on/off count(s) (S106). The submitted date and time is set to the print job managing unit 15 with the current time measuring by the horologe 25. The print job managing unit 15A may set initial value, for example, space, to the deleted date and time in the print job management table 131A (FIG. 15, "-").

Figure 16:
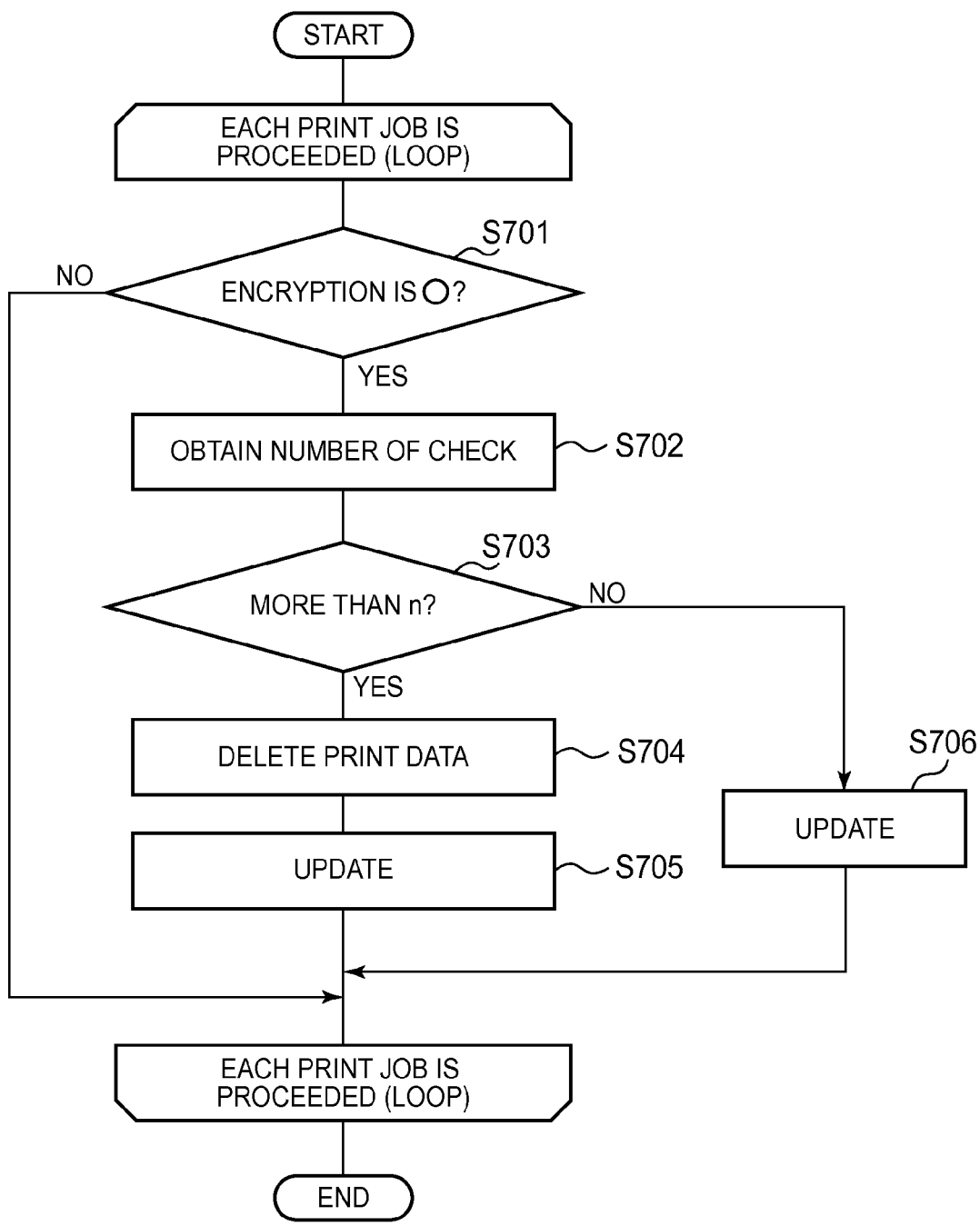
FIG. 16 is a flowchart showing printer operation in FIG. 14 when a process of detecting a turn on command is executed.

Referring with FIG. 16, a processing of the printer 1A when the printer 1A is turned on is described below.

If the printer 1A is turned on and the printer 1A works with the normal print mode, the print job monitoring unit 24 may refer to the print job management table 131A, and execute repeatedly processes at S701 to S706 for all the print job(s).

The print job monitoring unit 24 may select a print job from the print job management table 131A, and check whether the print data of the selected print job is encrypted (S701). In particular, the print job monitoring unit 24 may check whether the user side encryption or the printer side encryption is "O" (FIG. 15).

Next, if print data of a print job is not encrypted, in particular, both of the user side encryption and the printer side encryption are "X" (FIG. 15), the print job monitoring unit 24 may finish the processes at S701 to S706 for the print job.

If the user side encryption or the printer side encryption in print job management information 132A is "O" (FIG. 15), the print job monitoring unit 24 may obtain the on/off count(s) (S702) and check that whether the on/off count(s) are greater than threshold value n (S703).

If the on/off count(s) is greater than threshold value n in print job management information 132A (S703), the print job monitoring unit 24 may delete the print data corresponding to the print job management information 132A (S704), and the print job monitoring unit 24 may update the print job management table 131A (S705). In the process at S705, the print job monitoring unit 24 may increment the on/off count, for example, the incremental value is 1, and set the current date to the deleted date and time. If the on/off count (s) is not greater than threshold value n in the print job management information 132A (S703), the print job monitoring unit 24 may increment the on/off count(s) in the print job management table 131A (S706).

Printing Process of the Printer in Second Embodiment

Figure 17:
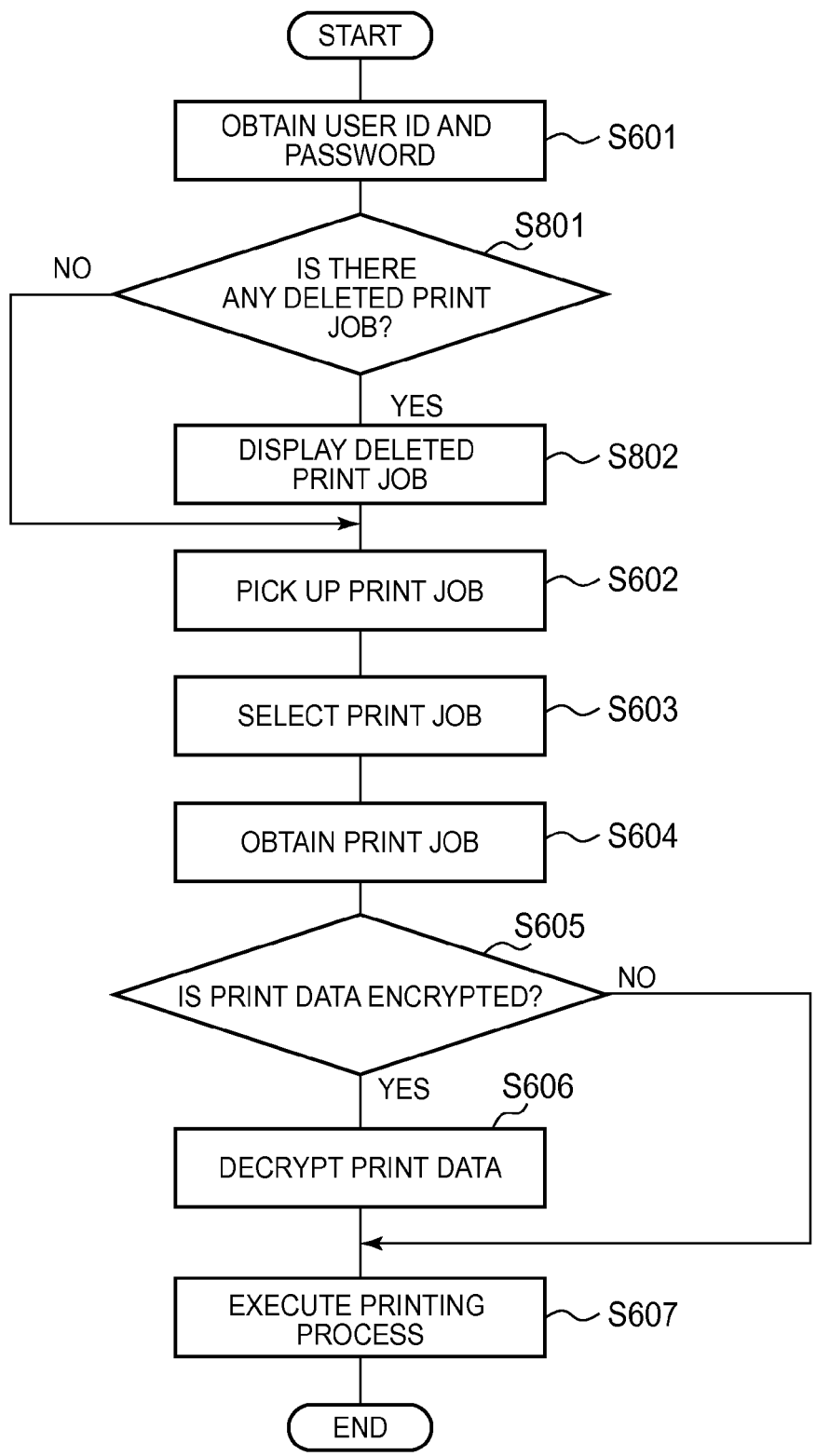
FIG. 17 is a flowchart showing printer operation in FIG. 14 when a process of printing with an authentication is executed.

Referring to FIG. 17, a printing process with the authenticated print mode and the encrypted print mode is described below.

As shown in FIG. 17, the printing process includes a process at S801 and S802 between the process at S601 and S602 in addition to the processing of printing in the first embodiment.

At first, the print job managing unit 15A authenticates based on the user ID and the password that are entered (S601). If the authentication is success, the print job managing unit 15A may pick up all of the print job(s) corresponding to the print data that is deleted based on the user ID. For example, if the user ID is "user01", the print job managing unit 15A may pick up all of the print job(s) corresponding to the "user01", and check whether there is any print data that is deleted in the print job(s) that are picked up. If there is greater than one print data that is deleted (S801), the print job managing unit 15A may make the input unit 19 display a deleted print job(s) screen (S802). The deleted print job(s) screen may be a screen that displays information of deleted print job(s) that includes the print job name, the submitted date and time, and the deleted date and time.

Constitution of Deleted Print Job(s) Screen

Figure 18:
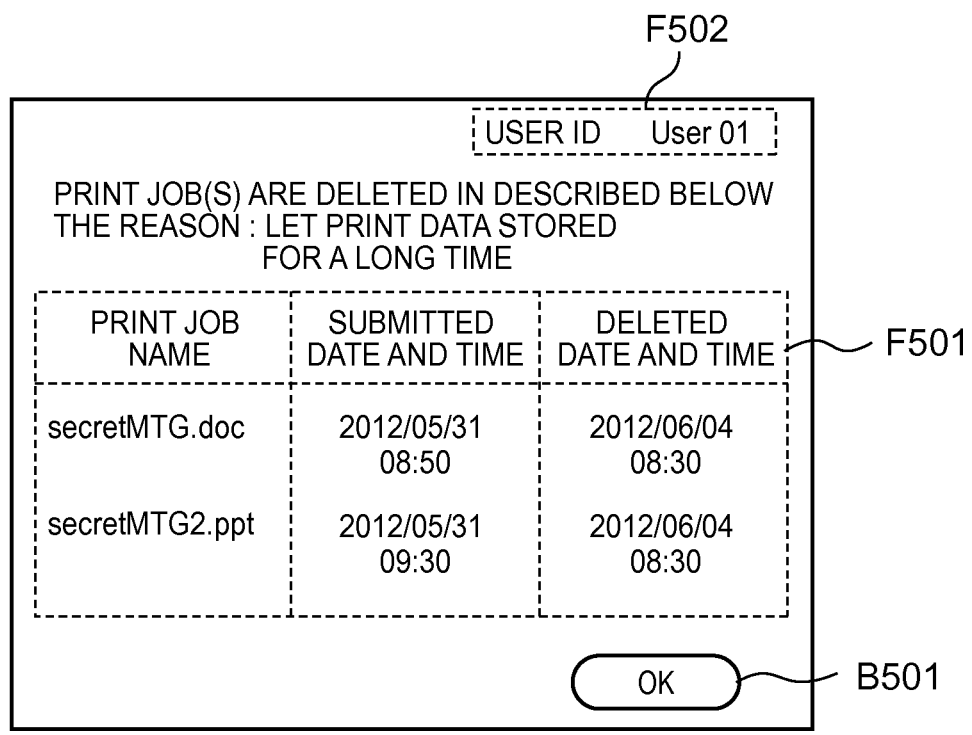
FIG. 18 illustrates a delete screen for deleting a print job that is displayed by the information processing device in FIG. 14.

As shown in FIG. 18, the deleted print job(s) screen may include a display field F501, a display field F502, and an ok button B501. The display field F501 may display a list of the deleted print job. The list of the deleted print job may include the print job name(s), the submitted date and time, and the deleted date and time. The OK button B501 may make a decision to execute next process.

Next, when the ok button B501 is clicked, the print job managing unit 15 may delete the information of the deleted print job(s) in the print job management table 131A (FIG. 18, F501). Thus, the print 1A may display the information of the deleted print job(s) on the deleted print job(s) screen one time.

As shown in FIGS. 13 and 15, if the user side encryption or the printer side encryption is "O" (S701), the print job monitoring unit 24 may check that whether the on/off count (s) is greater than threshold value n (S703). Likewise, if the on/off count(s) is not greater than threshold value n, the print job monitoring unit 24 may increment the on/off count (s) in the print job management table 131A (S706). However, the print job monitoring unit 24 is not limited to the way of managing described above, for example, if the printer side encryption is "O", the print job monitoring unit 24 may check that whether the on/off count(s) is greater than threshold value n. If the printer 1 keeps working with the normal operating mode for a long time, the print job monitoring unit 24 may check the threshold value after predetermined time passed. The threshold value n may be equal to 0. Likewise, if the on/off count(s)

is not greater than threshold value n, the print job monitoring unit 24 may increment the on/off count(s) in the print job management table 131A. If the on/off count(s) is greater than threshold value n, the print job monitoring unit 24 may execute the processes at S704 and S705. The deleted print job(s) screen is described in FIG. 19. Thus, the image forming system may avoid letting the print data that is unencrypted stored for a long time in the memory unit 13.

As shown in FIG. 17, processes at S602 to S607 may be same to the processes at S602 to S607 in FIG. 13.

The print data (print job(s)) in memory unit 13 may be deleted after a predetermined condition(s) satisfy. For example, if the print data is let being stored in memory unit 13 for a long time, the print data may be deleted. Thus, the image forming system may improve more secure than the first embodiment.

Other Embodiments

The image forming system includes the printer, described above. However, what the image forming system includes is not limited to the printer, for example, the image forming system may include a photocopy machine, a multifunction machine, and facsimile machine instead of the printer.

Figure 20A:
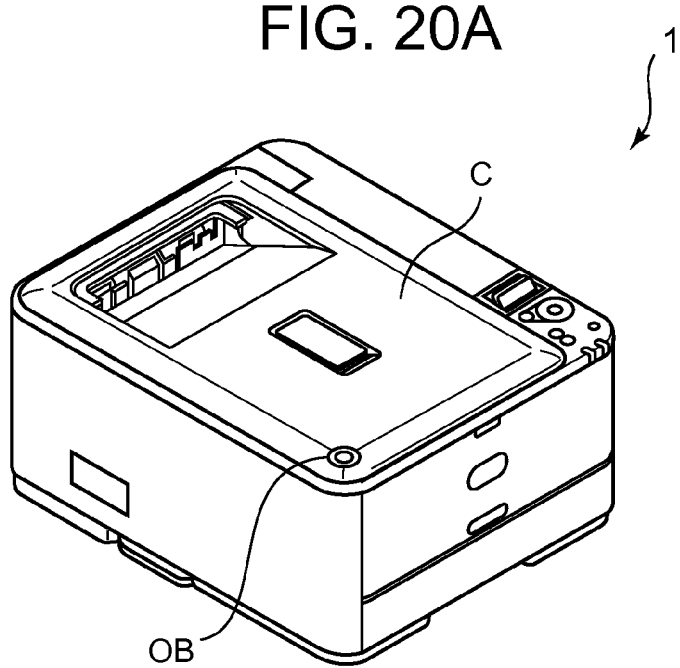
FIGS. 20A and 20B are perspective views showing a variation of the printer in FIG. 1.
Figure 20B:
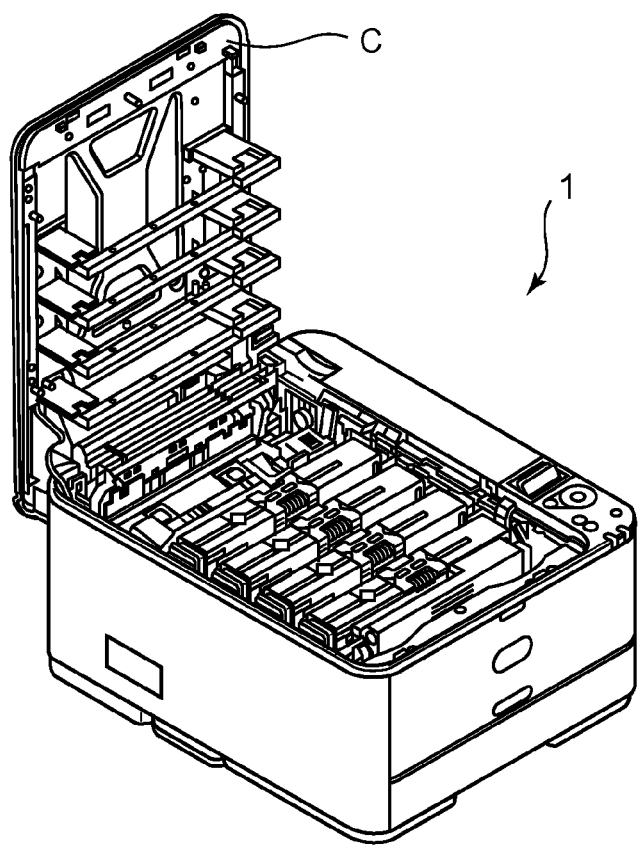

As described above, in the preliminary process, the encryption for the print data by the mode detecting unit 16 may be executed when the electric control unit 21 executes a transition from the first mode to the second mode that is less power consumption than the first mode. However, the condition that the encryption for the print data is executed is not limited to the transition from the first mode to the second mode, for example, as shown in FIGS. 20A and 20B, the printer 1 includes a cover C and a button OB to open the cover C. Likewise, if the cover C is detected that the button OB is pressed, the encryption for the print data may be executed.

When the printer 1 encrypts the print data, the cryptography key in the header of the print data is used. However, the source of the cryptography key is not limited to the header portion in the print data, for example, the source of the cryptography key may be the other data except for the print data. The other data that includes the cryptography key may be encrypted and transmitted to the printer 1.

While the foregoing has particularly shown and described with reference to certain specific embodiments, it will be understood by those skilled in the art that the foregoing and other changes in form and details can be made therein without departing from the spirit and scope of the appended claims.

What is claimed is:

1. An image forming apparatus for printing an image on a sheet, comprising:
   an image forming unit that prints the image on the sheet based on an image data;
   a memory unit that stores image data of an authenticating print job which needs an authentication before the image data is printed on the sheet by the image forming unit;
   a mode detecting unit that detects a transition from a first operating mode to a second operating mode; and
   an encryption unit that encrypts the image data in the memory unit when the transition from the first operating mode to the second operating mode is detected, wherein
   the image data of the authenticating print job is printed after the authentication without an encryption to the image data by the encryption unit while the transition is not detected, and
   the encryption unit encrypts only the image data of the authenticating print job upon the image data being unencrypted when the transition from the first operating mode to the second operating mode is detected.

2. The image forming apparatus of claim 1, wherein the second operating mode is less power consumption than the first operating mode.

3. The image forming apparatus of claim 1, further comprising:
   an input unit that receives an request for a forming image;
   a decryption unit that decrypts the encrypted image data based on the request; and
   the image forming unit that forms the image on the sheet based on the image data.

4. The image forming apparatus of claim 1, further comprising:
   a communication unit that receives the image data that is externally sent, wherein;
   the communication unit receives the image data that is either encrypted or unencrypted.

5. The image forming apparatus of claim 4, further comprising:
   a deleting unit that deletes the image data that is encrypted when certain predetermined conditions meet.

6. The image forming apparatus of claim 5, wherein the deleting unit does not delete any image data that is stored in the memory unit that is externally encrypted.

7. The image forming apparatus of claim 5, wherein one of the predetermined conditions is that a number of times that the image forming apparatus has been powered on is greater than a threshold value.

8. The image forming apparatus of claim 5, wherein the deleting unit deletes the image data when it is not encrypted after a predetermined time passes.

9. The image forming apparatus of claim 1, wherein the memory unit stores image data according to one of a plurality of print modes, each print mode corresponding to particular level of security, wherein
   the plurality of print mode includes a normal print mode and a secure print mode.

10. The image forming apparatus of claim 9, wherein the secure print mode further includes an authenticated print mode and an encrypted print mode, and
    the authenticating print job further includes an encrypted print job, wherein
    the authenticating print job that includes authentication information and unencrypted image data is provided to the image forming apparatus when the print mode is the authenticated print mode, and
    the encrypted print job that includes the authentication information and encrypted image data is provided to the image forming apparatus when the print mode is the encrypted print mode.

11. The image forming apparatus of claim 10, wherein the encryption unit encrypts the image data on condition of both the authenticated print mode and the second operating mode.

12. An image forming apparatus for printing an image on a sheet, comprising:
    an image forming unit that prints the image on the sheet based on an image data
    a memory unit that stores image data of an authenticating print job which needs an authentication before said the image data is printed on the sheet by the image forming unit;
    an operating mode detecting unit that detects a change in an operating mode of the image forming apparatus from a first operating mode to a second operating mode; and
    an encryption unit that encrypts the image data when the change from the first operating mode to the second operating mode is detected, wherein the image data of the authenticating print job is printed after the authentication without an encryption to the image data by the encryption unit while the change is not detected, and the encryption unit encrypts each of the image data of the authenticating print job upon the image data being unencrypted when the change from the first operating mode to the second operating mode is detected.

13. The image forming apparatus according to claim 12, wherein the memory unit stores image data according to one of a plurality of print modes, wherein the plurality of print modes includes encryption mode and non-encryption mode, the operating mode may be a turn-off mode, and when the operating mode detecting unit determines that the change in the operating mode is a change to turn-off mode, the encryption unit encrypts any image data stored according to non-encryption mode.

\* \* \* \* \*